United States Patent [19]

Steckler

[11] Patent Number: 4,594,658
[45] Date of Patent: Jun. 10, 1986

[54] HIERARCHY OF CONTROL STORES FOR OVERLAPPED DATA TRANSMISSION

[75] Inventor: Thomas M. Steckler, Christiana, Pa.

[73] Assignee: Burroughs Corporation, Detroit, Mich.

[21] Appl. No.: 789,353

[22] Filed: Oct. 21, 1985

Related U.S. Application Data

[63] Continuation of Ser. No. 482,238, Apr. 5, 1983, abandoned.

[51] Int. Cl.⁴ ............................................. G06F 9/22
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,859,636 | 1/1975 | Cook | 364/200 |
| 3,991,404 | 11/1976 | Brioschi et al. | 364/200 |
| 4,038,643 | 7/1977 | Kim | 364/200 |
| 4,099,230 | 7/1978 | Mead | 364/200 |
| 4,129,901 | 12/1978 | Masuda | 364/900 X |
| 4,168,523 | 9/1979 | Chari et al. | 364/200 |
| 4,251,862 | 2/1981 | Murayama | 364/200 |
| 4,298,949 | 11/1981 | Poland | 364/200 X |
| 4,376,976 | 3/1983 | Lahti et al. | 364/200 |
| 4,467,415 | 8/1984 | Ogawa | 364/200 |

Primary Examiner—Raulfe B. Zache
Assistant Examiner—Thomas Lee
Attorney, Agent, or Firm—Mervyn L. Young; Kevin R. Peterson

[57] ABSTRACT

A controller for communication between the auxiliary processor and a cache mechanism in the system interface which communication is to be carried on independently of main memory accesses required to update the cache mechanism in an overlapped manner.

7 Claims, 6 Drawing Figures

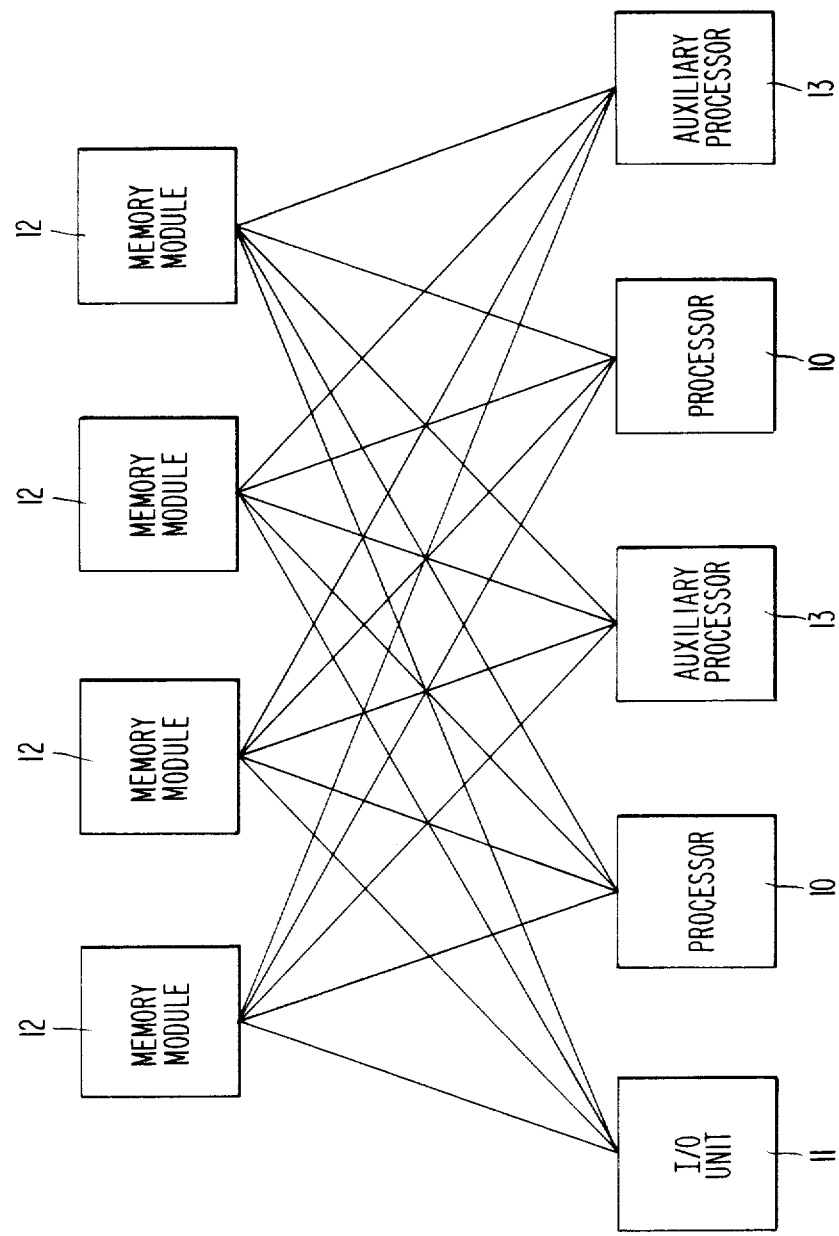

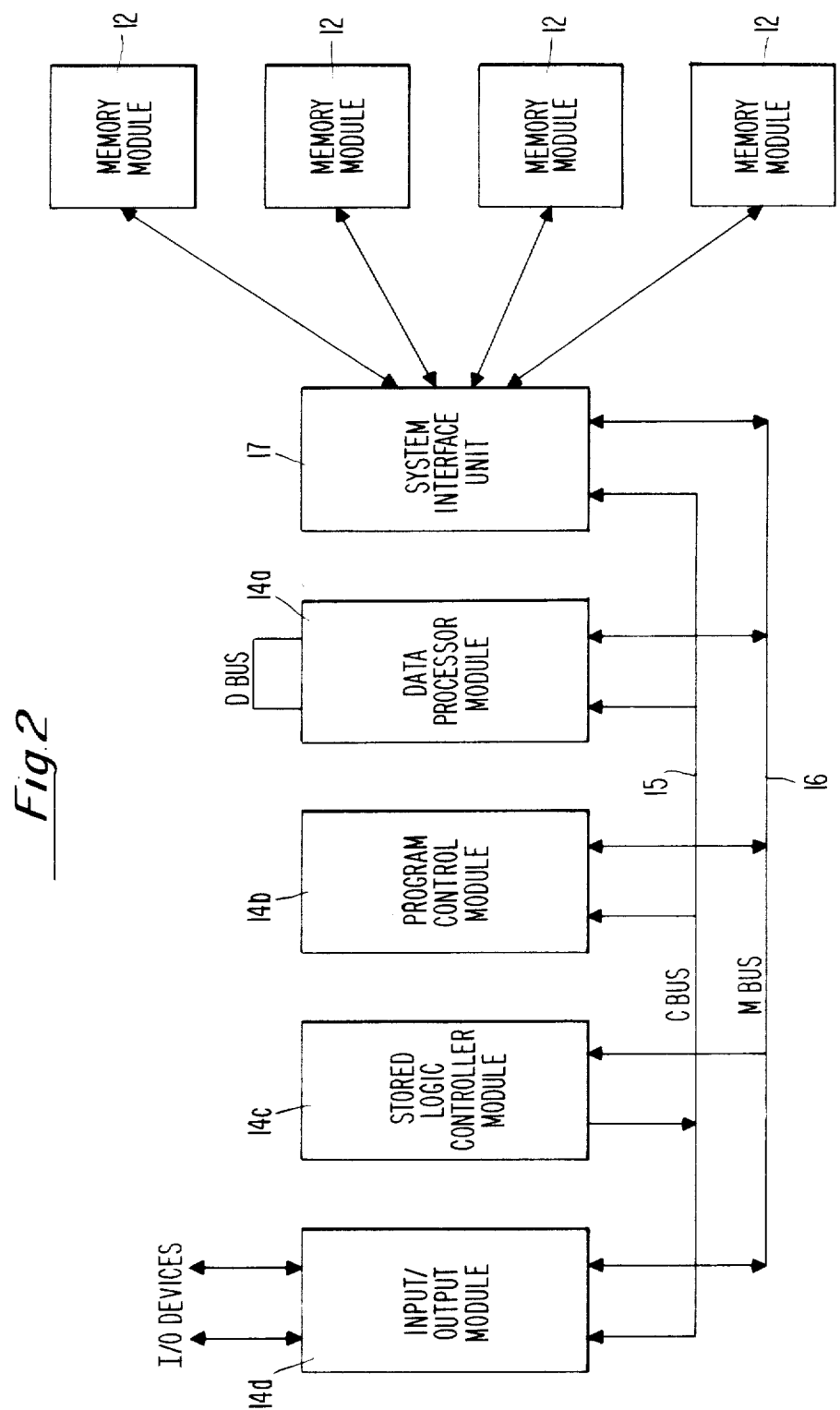

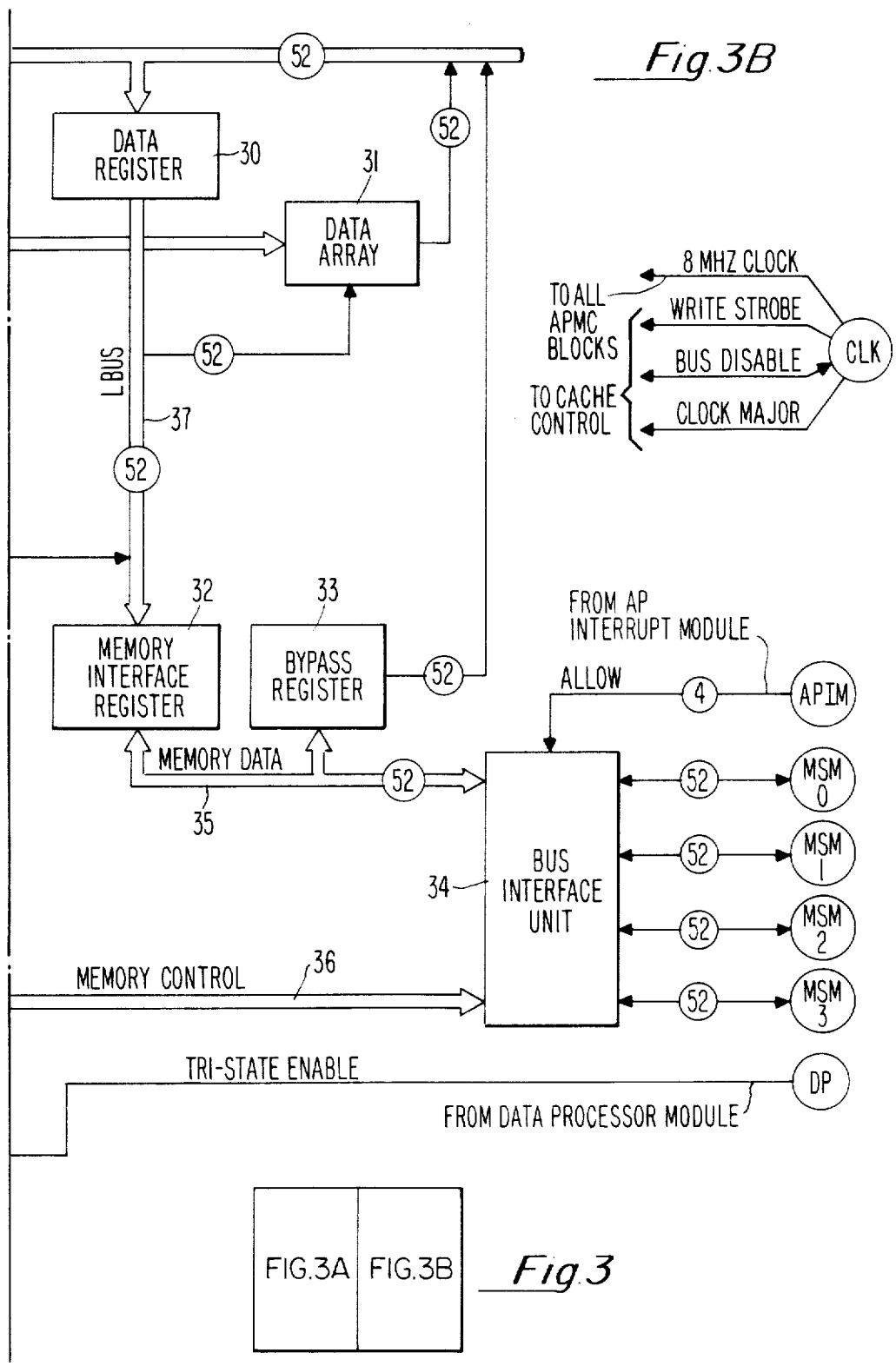

HIERARCHY OF CONTROL STORES FOR OVERLAPPED DATA TRANSMISSION

This is a continuation of co-pending application Ser. No. 482,238 filed on 4/5/83 now abandoned.

RELATED U.S. PATENT APPLICATIONS

U.S. patent applications directly or indirectly related to the subject application are the following.

Ser. No. 482,237, filed Apr. 5, 1983 by Thomas M. Steckler and entitled Multilevel Controller for a Cache Memory Interface in a Multiprocessor System.

BACKGROUND OF THE INVENTION

1. Field of the Invention

This invention relates to a multilevel controller and more particularly for such controller for a cache memory interface between a data processor and another processing system each of which have different operating speeds as well as memory addressing requirements.

2. Description of the Prior Art

In the interfacing of two different data processing systems, particularly of different performance rates, a number of incompatabilities are encountered. Such incompatabilities include differences in memory access times, the different clock frequencies at which the respective processors are operated, different command structures and memory addressing capabilities of the respective processors.

The present invention is directed toward interfacing one or more commercially available entry level data processors such as Burroughs B5900 with a large multiprocessing system, which entry level data processors serve as auxiliary processors for the purposes of handling off-loaded chores and also maintenance routines where required. The performance and throughput of the system is thus greatly enhanced by relieving the main data processing units of such tasks. Incompatabilities must be resolved due to the fact that the large multiprocesing system clock rate can be different than that of the entry level data processor, and the main memory system is 128 times the capacity of the entry level system. This in turn, requires memory control words which contain more bits than does the entry level system. Further, because the main memory system is a hundred twenty-eight times that for which the entry level data processor was designed, its access time is larger than that of the entry level processor.

The system interface of the present invention resolves these incompatabilities in a number of ways. The system interface resolves the difference in memory access capabilities by providing a cache mechanism for storing a number of data and code words at a time, which words are fetched from the main memory system while the auxiliary processor is working with the data and code words currently in the cache mechanism. The use of such a cache mechanism as a buffer between a large but relatively slow memory system and a data processor and the provision for accessing a large back-up memory should a requested data element not be present in the cache mechanism is disclosed in the Barton U.S. Pat. Nos. 3,292,152 and 3,292,153. Such techniques are employed in many commercially available data processing systems such as the IBM System 360/370 series.

In addition, the system interface anticipates and prefetches from the main memory system those segments or "pages" of code which would normally be next required by the auxiliary processor. The system interface is also adapted to convert the auxiliary processor's commands into memory control words as well to synchronize the clocks of the main memory system and the auxiliary processor respectively.

It will be appreciated from the above, that the system interface must control a number of different actions occurring between the auxiliary processor and the main memory system, which actions are requested and occur independently of one another, and since the auxiliary processor and the main memory system with which it communicates have independent controls, the system interface requires a multilevel control unit to control the various independent operations without denying access to portions of cache memory currently being used by the auxiliary processor.

It is then, an object of the present invention to provide an improved system interface between an auxiliary processor and a large multiprocessing system having different data rates, memory capacity and control word format.

It is another feature of the present invention to provide such a system interface with a multilevel control unit to control independently initiated actions across the interface.

It is still another object of the present invention to provide such a multilevel control unit which nevertheless synchronizes independently requested actions across the interface.

SUMMARY OF THE INVENTION

In order to accomplish the above-identified objects, the system interface of the present invention resides between an auxiliary processor and a main memory system of a multiprocessing system. The interface is divided into two portions or modules: a cache mechanism module and a main memory interface module. The cache mechanism module performs normal cache functions of receiving data and code words from main memory at a slower frequency but higher clock rate and supplies those words to the auxiliary processor at a faster frequency but slower clock rate. The memory interface module initiates requests for main memory accesses in response to requests from the auxiliary processor. Both modules are under the control of the microprogram controller; however, since the functions of both modules overlap, the controller is formed of two control stores for the cache mechanism module and the main memory interface module, respectively. The cache mechanism control store receives code information from the auxiliary processor as well as condition signals and supplies commands to that mechanism and also addresses to the main memory interface control store, that in turn, supplies commands to the main memory interface module as well as notifying the cache mechanism control store of its current state for the purposes of synchronization.

A feature then, of the present invention resides in a microprogram controller for a system interface between an auxiliary processor and a main memory system which controller includes two control stores, one to control the functions of a cache mechanism and the other to control the functions of main memory accessing where the first control store provides addresses or commands to the second control store that in turn notifies the first control store of its current state.

BRIEF DESCRIPTION OF THE DRAWINGS

The above and other advantages and features of the present invention will become more readily apparent from a review of the following specification when taken in conjunction with the drawings wherein:

FIG. 1 is a schematic diagram of a multiprocessing system employing the present invention;

FIG. 2 is a schematic diagram of an auxiliary processor and its connection to a system interface of the present invention;

FIG. 3 comprising FIGS. 3A and 3B are a schematic diagram of the system interface employed with the present invention.

GENERAL DESCRIPTION OF THE INVENTION

Figure 3A:
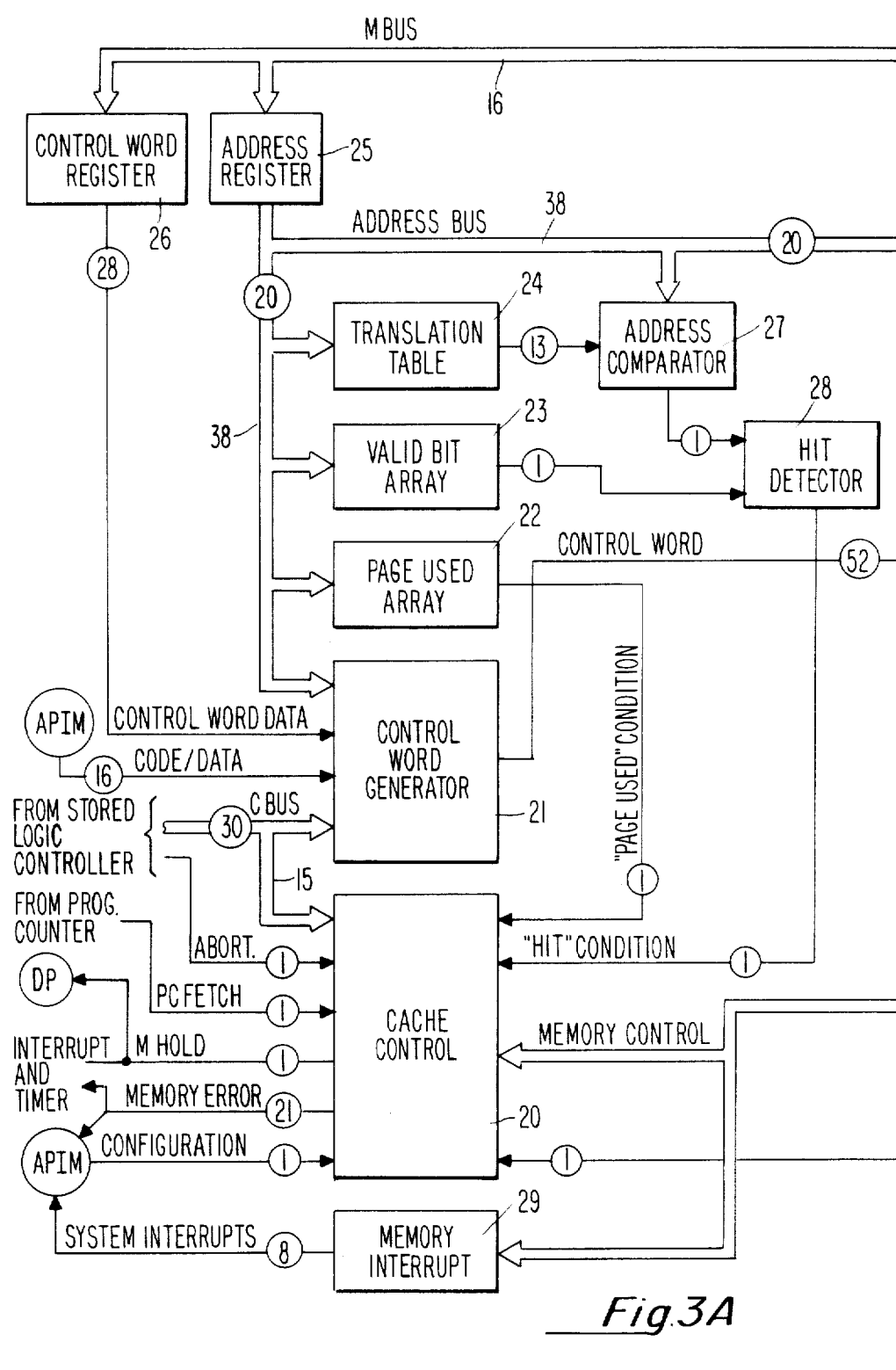

As was indicated above, the present invention is directed toward the interfacing of an entry level data processor into a large multiprocessing system which entry level processor serves as an auxiliary processor to handle off-loaded chores to enhance the performance and throughput of the system as a whole. The present invention is embodied in a system interface which resolves differences in memory access capabilitites, data rates and clock frequencies by providing a cache memory mechanism and a main memory interface mechanism which operate in overlap fashion under control of a two-level microcontroller.

Such multiprocessing system is illustrated in FIG. 1 and may be of the type described in the Mott et al U.S. Pat. No. 3,319,226. The system includes a plurality of main processing units 10 and one or more I/O processors 11 each of which can communicate with any one of a plurality of memory modules 12. In addition, the system includes a plurality of auxiliary processors 13, which may be just a commercially available entry level processor which nevertheless has a slower clock frequency and less memory addressing capabilities. For example, in the embodiment of the present invention, the entry level or auxiliary level processor has a clock rate of 4 MEGHZ while the rest of the system has a clock rate of 8 MEGHZ. Furthermore, an auxiliary processor is capable of addressing only a million words of memory while, in the present invention, four main memory modules 12 are capable of storing 128 million words of data and code. However, because of the size of the main memory system in FIG. 1, the memory access time is typically 1600 nanoseconds while the auxiliary processors 13 are designed for memory access time of only 600 nanoseconds.

A typical auxiliary processor and the system interface for the present invention are illustrated in FIG. 2 where the auxiliary processor is a modular two primary bus system that includes data processing module 14a, program control module 14b, stored logic controller module 14c and an Input/Output module 14d which communicate with one another via CBUS 15 and MBUS 16. CBUS 15 is used to broadcast control information from stored logic controller 14c to all the other modules while MBUS 16 is used to transfer data and address information to the various modules of the auxiliary processor. DBUS is illustrated as being employed locally within data processing module 14a.

In addition, auxiliary processor of FIG. 2 would include a memory control module to access the local memory of one million words. However, since the auxiliary processor is to interface with a much larger system, such a controller is replaced in FIG. 2 by system interface unit 17 which communicates with the rest of the auxiliary processor by way of CBUS 15 and MBUS 16.

A diagram of the functional units of the system interface of the present invention is provided in FIG. 3 which illustrates the various functional units of the cache mechanism, main memory interface mechanism, and the two level microcontroller 20 for providing control of a cache mechanism and main storage interface mechanism in an overlap manner in accordance with the present invention. Data and addresses are supplied to the cache memory mechanism by way of MBUS 16 of FIG. 2. Data for storage in main memory system is passed through the cache mechanism to main memory interface mechanism for transmission to the main memory system. Data and code received from the main memory system is received by the main memory interface mechanism and transmitted to the cache memory mechanism for subsequent transmission to the auxiliary processor on MBUS 16. Individual data words can also be transmitted directly from the main memory interface mechanism to the MBUS 16. Commands are received by microcontroller 20 from CBUS 15 of FIG. 2 to drive the respective cache and main memory interface control stores to activate their corresponding units. The main memory interface mechanism also receives commands from CBUS 15 for the generation of main memory control words for the accessing of data in main memory.

DETAILED DESCRIPTION OF THE INVENTION

Cache Memory Mechanism

The principle function of the cache memory mechanism is to reduce memory access times from approximately 1600 nanoseconds for the large main memory system to the 600 nanosecond access time of the auxiliary processor. In addition, the cache mechanism includes an efficient cache purge mechanism requiring only a few clock times. All stores to the cache mechanism from the auxiliary processor are to be immediately passed onto the main memory system. In addition, the cache memory mechanism also performs program code prefetching as will be more thoroughly described below. Referring again to FIG. 3, the principle element of the cache mechanism is data array 31 which is a random access memory of 256 word locations or registers of 52 bits each. The array is divided such that program code occupies 128 words and data occupies 128 words. The segregation of program code from data allows prevention of random data accesses from overwriting code loops which may be captured in the cache as well as facilitates the selective purging of data without purging useful program code and also allows for the program code prefetching mechanism to be more further described below.

Each of the 128 word groups is divided into 16 eight word pages so as to allow all fetches to the main memory system to be eight word operations.

Addressing data array 31 is accomplished by passing the seven least significant bits (4 page bits and three word bits) of the requested 20 bit address to the data array. The most significant address bit is generated by the cache control unit which determines from the requested operation whether to access the program code or the data portion of the data array.

Translation table 24 of FIG. 3 is organized as 32 word locations of 13 bits each. Each word location corresponds to an 8 word page in data array 31. There are 16 words corresponding to program code entries and 16 words corresponding to data entries in the data array. The 13 bit word in the translation table is a 13 most significant address bits of the data held in the corresponding page of data array 31. The translation table is addressed by 4 page bits of the requested 20 bit address. The most significant address bit of the translation table is generated by a control unit 20. When the output of translation table 24 compares with the 13 high order bits of the requested address, address comparator 27 signals hit detection unit 28.

Valid bit array 23 is used to indicate the validity or proper entry of an address in translation table 24. It is arranged as two 4 by 4 register files containing one bit for every entry in translation table 24. This arrangement allows the cache to be purged in 4 clock times instead of 32 since all that is necessary to purge the cache is to reset the valid bits in the valid bit array. The valid bit array is addressed by the page bits of the requested 20 bit address. As in the case of data array 31 and translation table 24, the most significant address bit for the valid bit array is generated by control unit 20.

Page used array 22 has one bit corresponding to every entry in the program code portion of the translation table 24. It also is implemented in a physically separate 4 by 4 register file. The page used array 22 is employed by the program code look-ahead or prefetch algorithm. It is managed by control unit 20.

The cache mechanism is activated by receipt by address register 25 of a 20 bit address from MBUS 16 which address is simultaneously supplied to translation table 24, valid bit array 23, address comparator 27, page used array 22 and data array 31. If control unit 20 has also received a fetch command from CBUS 15, the output of translation table 24 is compared by hit detection unit 28 with the 13 most significant bits of the requested 20 bit address. If they are equal and valid bit corresponding to the translation table entry is true, the data now present at the output of data array 31 is the requested data. Otherwise, the requested data is not present in the cache mechanism and must be requested from main memory. If the fetch request is for program code, the prefetching algorithm described below is also invoked.

When control unit 20 receives a store command from CBUS 15, the translation table 24 is compared with the 13 most significant bits of the requested 20 bit address and, if they are equal and the valid bit corresponding in the translation table entry is true, hit detection unit 27 signals control unit 20 causing it to generate a write signal to the data array. The data is also sent to the main memory interface mechanism for transmission to main memory.

The prefetch algorithm is essentially as follows:

When code is requested by the auxiliary processor, the cache mechanism determines whether the requested page is present in data array 31.

If the requested page is present in data array 31, the requested word is transmitted to the auxiliary processor. If the Page Used Bit associated with the requested page is set, the operation terminates. If the Page Used Bit associated with the requested page is not set, a prefetch operation is initiated. The control unit calculates the address of the "NEXT" eight word page. This address is presented to the cache mechanism which determines whether the "NEXT" page is present in data array 31. If it is present, the Page Used Bit associated with the requested page is set and the operation terminates. If it is not present, the cache control unit directs the memory interface control unit to initiate a main memory request for the "NEXT" page. At this time, the Page Used Bit associated with the requested page is set and the cache control unit goes to the idle state thereby making it available to service auxiliary processor requests. Meanwhile, the memory interface control unit maintains communication with the main memory system. When the main memory system responds with the "NEXT" page data, the memory interface control unit directs this data to the appropriate location in data array 31. The memory interface control unit resets the Page Used Bit associated with the "NEXT" page and enters the idle state thereby completing the prefetch operation.

If the requested page is not present in data array 31, a main memory request is initiated. When the main memory system returns the requested page, the data is directed to the appropriate location in data array 31. Simultaneously, the requested word is directed to the auxiliary processor. At this time the control unit calculates the address of the "NEXT" eight word page. This address is presented to the cache mechanism which determines whether the "NEXT" page is present in data array 31. If it is present, the Page Used Bit associated with the requested page is set and the operation terminates. If it is not present, the cache control unit directs the memory interface control unit to initiate a main memory request for the "NEXT" page. At this time, the Page Used Bit associated with the requested page is set and the cache control unit goes to the idle state thereby making it available to service auxiliary processor requests. Meanwhile, the memory interface control unit maintains communication with the main memory system. When the main memory system responds with the "NEXT" page data, the memory interface control unit directs this data to the appropriate location in data array 31. The memory interface control unit resets the Page Used Bit associated with the "NEXT" page and enters the idle state thereby completing the prefetch operation.

Main Memory Interface Mechanism

The remaining functional elements in FIG. 3, except for control unit 20, form the main memory interface mechanism of the present invention. These functional units include memory bus interface unit 34, memory interface register 32, bypass register 33 and control word generator 21. With these units, the main memory interface mechanism interfaces the auxiliary processor to the main multiprocessing system. More specifically, it interfaces the four main memory units 12 of FIG. 1 with the above-described cache memory mechanism and thus the auxiliary processor.

Bus interface unit 34 is capable of selectively listening to any one but only one of the four memory modules 12 in FIG. 1 and it is capable of broadcasting to all such memory modules simultaneously. The buses between bus interface unit 34 and the respective memory modules is basically a bidirectional 52 bit wide bus. In addition, the bus interface unit includes a handshake unit (not shown) which is responsible for sending and receiving control signals to and from the four memory modules. The primary control lines to the respective memory modules, in addition to the 52 bit wide bus include a requester to memory request line, a requestor to memory data valid line, a memory to requestor acknowledge line, and the memory to requester fail line.

Control word generator 21 takes commands from the auxiliary processor by way CBUS 15 and converts them into main memory module control words. This unit is responsible for the extended address capability required to address the main memory system. Control words are 52 bits in width and are of two different formats. One format is the memory operation request which is used for normal memory operations such as fetch and store and contains four different fields plus the fifth field which is not employed. The four fields are a twenty bit address field supplied by the auxiliary processor from MBUS 16 by way of address register 25 and address bus 38; an extended address field which is obtained from one of two base registers (not shown) in control word generator 21; a length field which specifies whether one data or code word is to be fetched from memory or eight such data or code words; an opcode field which contains a main memory defined opcode consistent with the operation being performed with one of the main memory modules.

The two base registers, which provide the extended address field during a fetch from main memory, are "data environment register" and a "code environment data register" which are respectively being used according to whether or not data or code is being received from one of the main memory modules. Finally, parity is generated for the overall control word and inserted into a parity field.

The other control word format is a memory management request control word which is used to request special memory management operations. It is 52 bits in width and contains an opcode field similar to the one described in the memory operation request control word; a length field which is always one and a variant field which is generated by the auxiliary processor to create variations of basic requests, thus reducing the number of opcodes required.

Cache bypass register 33 is employed to provide a direct path from the main memory modules to MBUS 16. When data returning from one of the main memory modules is not going to update the cache mechanism, bypass register 33 is used to channel the data directly to the auxiliary processor. When the data returning from the main memory module is destined to update the cache mechanism and is required by the auxiliary processor, that data is copied by the bypass register 33 while simultaneously being supplied to memory interface register 32 to data array 31 by way of LBUS 37.

A word counter register (not shown) is provided as a three bit register which is the memory interface mechanism's ability to generate "word addresses" for purposes of updating the cache memory. When a requested data or program code data item is not present in the cache, the address of that item is sent, by way of interface mechanism, to one of the main memory modules. However, instead of requesting just that item, the entire page (8 words) where that item resides is requested. The page, however, is requested such that the requested word returns first from main memory module. For example, if the desired word is the fifth word in a given eight word page, the data returns from the selected memory module in the following sequence: word 5, word 6, word 7, word 0, word 2, word 3 and word 4.

This scheme allows the desired word to return, on the average, four clock times faster than would occur if the pages were returned always starting with word 0. The word counter captures the word bits (least significant bits) from the requested address. When the eight word page returns from memory module the word counter is incremented, modulo 8, to generate the "word address bits", so the cache mechanism can be updated.

Two level Control Store

Figure 4:
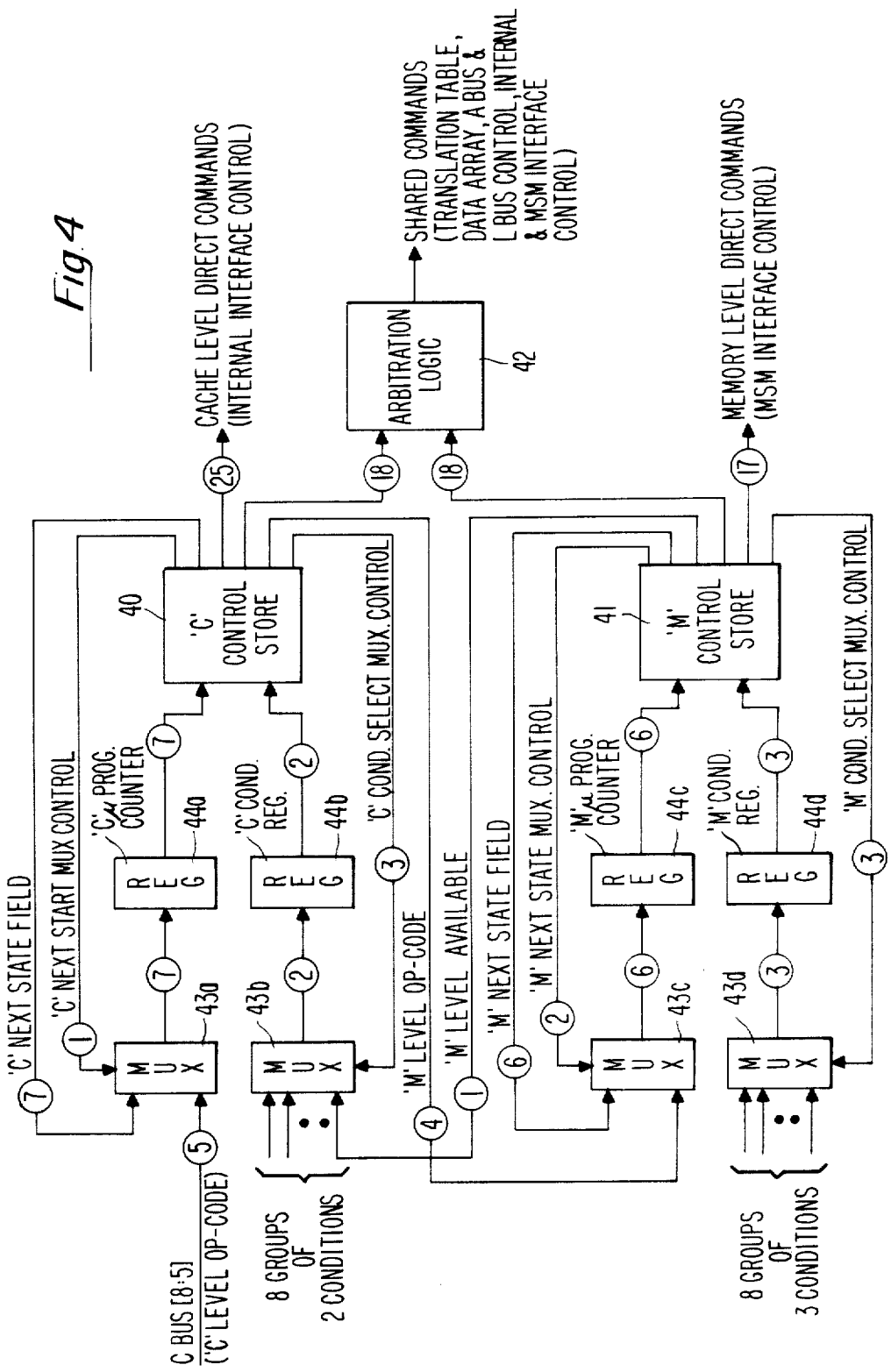
FIG. 4 is a schematic diagram of the two-level microprogram controller of the present invention.

Control unit 20 of FIG. 3 is illustrated in FIG. 4 and is comprised of two control stores arranged in a hierarchy with the first control store supplying control signals for the cache memory mechanism described above and also addresses to the second control store which supplies control signals to the main memory interface mechanism described above.

This control mechanism was designed with two overriding purposes. One consideration is the provision of a flexible mechanism which would allow changes in existing operations and the addition of new operations by providing control stores that can be configured or replaced. The other consideration is to allow program code prefetching that does not interfere with normal cache mechanism operation. The second consideration requires two microprogram controllers for keeping track of two asynchronous, simultaneous operations.

In FIG. 4, the cache memory controller is comprised of control store 40 which is addressed by the contents of both register counters 44a and 44b. The contents of register counter 44a include an address received by way of multiplexor 43a from CBUS 15 of FIGS. 2 and 3. This initial address is the first state of the routine which forms the requested cache mechanism operation. This first state knows the address of the next state, places the next state address on the next state field lines back to multiplexor 43a. It also changes the control of the next state multiplexor 43a selecting the next state field as an input to microprogram counter 44a. As the sequence continues, each routine state points to the next until the routine end is encountered. At this point, the control to the next state multiplexor 43a is changed so that CBUS 15 provides the next address to program counter 44a. Hence, the controller of FIG. 4 is available for the next auxiliary processor request and, if no request is present, CBUS will pass the appropriate signals to the contoller.

In addition to straight line sequencing, control store 40 can "test" two conditions by way of the low order address bits received by multiplexor 43b which passes the desired condition bits to condition register 44b. The conditions are examined during the next routine state. The inclusion of the condition testing allows for a more flexible microcontrol store.

Conditions tested by the cache memory control store include:
availability of the main memory interface control store to accept an operation;
availability of a clock or clock cycle for data transfer to or from the processor;
translation table parity error;
presence of a requested address in the cache mechanism;
currently addressed code page has been previously accessed (see prefetch algorithm above);
cache address limit error; and
last cache memory cycle awarded to main memory interface control store.

Control store 41 provides control signals for the main memory interface mechanism and is identical to cache control store 40 except that it receives the initial address (opcode) from cache control store 40 instead of the CBUS. In addition, it can test three conditions instead of two. Both control stores 40 and 41 respectively provide control signals to the cache memory mechanism and the main memory interface mechanism. They also provide shared commands by way of arbitration logic 42 for data array 31, translation table 24, address bus 38, LBUS 37 and bus interface unit 34. It is to be remembered that controls 40 and 41 operate asynchronously and arbitration logic 42 is provided to accept control signals from one or the other of the control stores.

Conditions tested by the main memory interface control store include:
  acknowledgment of main memory available for last memory request;
  an acknowledge signal has been received for more than one main memory module (an error condition);
  an error detected in a control word presented to main memory;
  an interface parity error;
  memory to requester data valid;
  main memory system has detected an internal failure;
  general purpose counter overflow;
  failure of main memory to respond to a request within a reasonable amount of time; and
  memory to requester operation complete.

In the controller of FIG. 4, the control flow is from the auxiliary processor CBUS to the cache mechanism control store 40 to the main memory interface control store 41, with each control store notifying the other of its current state. That is to say, the main memory interface control store sends a signal to the cache control store when it is idle and the cache control store notifies the auxiliary processor when it is not idle. This handshaking action prevents the driving control store from issuing another operation before the driven control store has completed a previous operation.

With the controller of FIG. 4, the cache mechanism control store can request a program code prefetch operation from main memory interface mechanism and, when the main interface control store is busy communicating with main memory, the cache mechanism control store is free to service auxiliary processor requests for code or data in the cache memory.

EPILOGUE

A two level controller has been described for a system interface between an auxiliary processor and main memory modules of a multiprocessing system which respective processor and system have different clock rates, memory access times and memory addressing capabilities. Such a controller allows for communication between the auxiliary processor and a cache mechanism in the system interface to be carried on independently of main memory accesses required to update the cache mechanism in an overlapped manner.

While the one embodiment of the present invention has been disclosed, it will be apparent to those skilled in the art that variations and modifications may be made without departing from the spirit and scope of the invention as claimed.

What is claimed is:

1. A control device for asynchronously controlling the simultaneous operation of a plurality of digital mechanisms in an overlapped manner in response to a command code from one of said mechanisms, said device comprising:
  at least a first control store and a second control store each having input register means, and output means coupled fto provide control signals to respective ones of said digital mechanisms, each of said output means also being coupled to its corresponding input register means to provide control state information signals thereto;
  said first control store input register means being coupled to said one of said mechanism to receive said command code as at least a part of an initial address, said first control store supplying, in response to said command code, a second command code as at least a part of an initial address to said second control store input register means;
  each control store input register means being provided with program counter means to increment a previous address to address the respective control store simultaneously with and independently of the other control store until said respective control state information signals indicate that a new address is to be received.

2. A control device according to claim 1 wherein:
  said second control store is coupled to said first control store input register means to signal said first control store that said second control store is ready to receive a command code.

3. A control device according to claim 2 wherein:
  each control store input register means is provided with a multiplexer circuit to receive its respective address, each control store having its output connected to its multiplexer circuit to supply its next address in lieu of said respective address according to the current state of the respective control store.

4. A control device according to claim 1 further including:
  arbitration logic coupled to the outputs of both control stores to receive control signals from one or the other of said control stores for controlling a third digital mechanism.

5. A control device for asynchronously controlling the simultaneous operation of a plurality of digital mechanisms in an overlapped manner in response to a command code from one of said mechanisms, said device comprising:
  at least a first control store and a second control store each having input register means, and output means coupled to provide control signals to respective ones of said digital mechanisms, each of said output means also being coupled to its corresponding input register means to provide control state information signals thereto;
  each control store being provided with a condition register to receive condition signals from its respective mechanism for transmission to the respective control store as a part of its address;
  said first control store input register means being coupled to said one of said mechanisms to receive said command code as at least a part of an initial address, said first control store supplying, in response to said command code, a second command code as at least a part of an initial address to said second control stor input register means;
  each control store input register means being provided with program counter means to increment a previous address to address the respective control store simulataneously with and independently of the other control store until said respective control state information signals indicate that a new address is to be received.

6. A control device according to claim 5 wherein:

said second control store is coupled to said condition register of said first control store to signal said first control store that said second control store is ready to receive a command code.

7. A control device according to claim 6 wherein:

each control store input register means is provided with a multiplexer circuit to receive its resepctive address, each control store having its output connected to said multiplexer circuit to supply its next address in lieu of said respective address according to the current state of the respective control store.

* * * * *